United States Patent
Sanada

(10) Patent No.: US 10,063,646 B2
(45) Date of Patent: Aug. 28, 2018

(54) CONTENT DISTRIBUTION SYSTEM, CONTENT DISTRIBUTION METHOD, AND NON-TRANSITORY COMPUTER READABLE STORAGE MEDIUM

(71) Applicant: YAHOO JAPAN CORPORATION, Tokyo (JP)

(72) Inventor: Tsutomu Sanada, Tokyo (JP)

(73) Assignee: YAHOO JAPAN CORPORATION, Tokyo (JP)

( * ) Notice: Subject to any disclaimer, the term of this patent is extended or adjusted under 35 U.S.C. 154(b) by 209 days.

(21) Appl. No.: 14/851,446

(22) Filed: Sep. 11, 2015

(65) Prior Publication Data

US 2016/0088062 A1    Mar. 24, 2016

(30) Foreign Application Priority Data

Sep. 18, 2014   (JP) .................. 2014-189773

(51) Int. Cl.
   *G06F 15/16*    (2006.01)
   *H04L 29/08*    (2006.01)

(52) U.S. Cl.
   CPC ............ *H04L 67/22* (2013.01); *H04L 67/306* (2013.01)

(58) Field of Classification Search
   CPC .............................. H04L 67/22; H04L 67/306
   USPC ........................................................ 709/201
   See application file for complete search history.

(56) References Cited

U.S. PATENT DOCUMENTS

2013/0238762 A1*   9/2013   Raleigh .................. H04L 67/306
                                                                    709/219
2014/0095727 A1    4/2014   Evans et al.
2015/0039601 A1*   2/2015   Harrang ............ G06F 17/30867
                                                                    707/727

FOREIGN PATENT DOCUMENTS

| JP | 2003-158552 A | 5/2003 |
| JP | 2004-013424 A | 1/2004 |
| WO | 2009/041483 A1 | 4/2009 |

OTHER PUBLICATIONS

Jul. 7, 2016 Office Action issued in Japanese Patent Application No. 2014-189773.

* cited by examiner

*Primary Examiner* — Alan S Chou
(74) *Attorney, Agent, or Firm* — Oliff PLC

(57) ABSTRACT

A distribution destination terminal selecting unit selects, from among a plurality of user terminals of a target user, a user terminal having a high probability of achieving a certain level of results by a behavior of the target user toward content when the content is distributed, as a distribution destination terminal of the content, based on a behavioral history in a behavioral history storage unit.

12 Claims, 6 Drawing Sheets

| USER A | USER TERMINAL (PC) | USER TERMINAL (TABLET) | USER TERMINAL (SMARTPHONE) | TOTAL NUMBER OF TIMES OF DISTRIBUTION | DISTRIBUTION ACCEPTABLE/ INACCEPTABLE |
|---|---|---|---|---|---|
| CONTENT X | 7 | 2 | 2 | 11 | DISTRIBUTION UNACCEPTABLE |
| CONTENT Y | 4 | 3 | 2 | 9 | DISTRIBUTION ACCEPTABLE |

FIG.2

| CONTENT ID | CONTENT TYPE | CONTENT |
|---|---|---|
| | | |

FIG.3

| USER ID | TERMINAL IDENTIFICATION INFORMATION | TERMINAL TYPE | BEHAVIOR |
|---|---|---|---|
| | | | |

FIG.8

| USER A | USER TERMINAL (PC) | USER TERMINAL (TABLET) | USER TERMINAL (SMARTPHONE) | TOTAL NUMBER OF TIMES OF DISTRIBUTION | DISTRIBUTION ACCEPTABLE/ INACCEPTABLE |
|---|---|---|---|---|---|
| CONTENT X | 7 | 2 | 2 | 11 | DISTRIBUTION UNACCEPTABLE |
| CONTENT Y | 4 | 3 | 2 | 9 | DISTRIBUTION ACCEPTABLE |
| ⋮ | | | | | |

CONTENT DISTRIBUTION SYSTEM, CONTENT DISTRIBUTION METHOD, AND NON-TRANSITORY COMPUTER READABLE STORAGE MEDIUM

CROSS-REFERENCE TO RELATED APPLICATION(S)

The present application claims priority to and incorporates by reference the entire contents of Japanese Patent Application No. 2014-189773 filed in Japan on Sep. 18, 2014.

BACKGROUND OF THE INVENTION

1. Field of the Invention

The present invention relates to a content distribution technique, particularly relates to a distribution destination selecting technique for selecting a content distribution destination from among a plurality of user terminals used by a user, when the content is distributed to the user.

2. Description of the Related Art

In recent years, multi-device users have been increasing. That is, it is becoming a general trend of utilization form that one user uses a plurality of user terminals including a smartphone, a tablet terminal, and a personal computer. In such a utilization form, a user selectively uses various user terminals according to a usage. Therefore, it is desirable that distributed content be distributed suitably for the purposes.

As a conventional technique for selecting a content distribution destination, a technique has been proposed to distribute the content to a selected distribution destination terminal, based on a user profile including equipped capabilities and a state of availabilities related to the user as a distribution destination, and based on metadata including required capabilities related to the distributed content (refer to Japanese Laid-open Patent Publication No. 2004-13424, for example).

In the conventional technique described earlier, the user terminal to be the distribution destination of the content is selected in consideration of hardware aspects including equipped capabilities related to the user terminal. Therefore, a terminal that properly reproduces the distributed content is selected as the distribution destination. However, since there is no consideration in this technique on a fact that the terminals are selectively used by the user corresponding to the actual usage, there has been a problem of not being able to properly select the content distribution destination according to the usage of the user terminal.

Due to this problem, a mismatch occurs, according to the conventional technique, between the distributed content and the distribution destination user terminal, including, for example, such that content with a large number of entry fields is distributed to the smartphone on which an operation burden is heavy in entering characters. Therefore, this has caused a problem that a ratio of causing the user to take an intended action after selecting or browsing the distributed content, has decreased, and leads to a loss of conversion opportunity particularly when the content is advertisement content.

SUMMARY OF THE INVENTION

It is an object of the present invention to at least partially solve the problems in the conventional technology.

According to one aspect of an embodiment, a content distribution system includes a behavioral history storage unit configured to store a behavioral history of a user, a distribution destination terminal selecting unit configured to select, from among a plurality of user terminals of a target user, a user terminal having a high probability of achieving a certain level of results by a behavior of the target user toward content when the content is distributed, as a distribution destination terminal of the content, based on the behavioral history in the behavioral history storage unit, and a distribution control unit configured to distribute the content to the user terminal that has been selected by the distribution destination terminal selecting unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 2 is an exemplary configuration of a content storage unit;

FIG. 3 is an exemplary configuration of a behavioral history storage unit;

FIG. 8 illustrates a counting example of the number of times of content distribution.

DETAILED DESCRIPTION OF THE PREFERRED EMBODIMENTS

Principle of Embodiment

Figure 1:
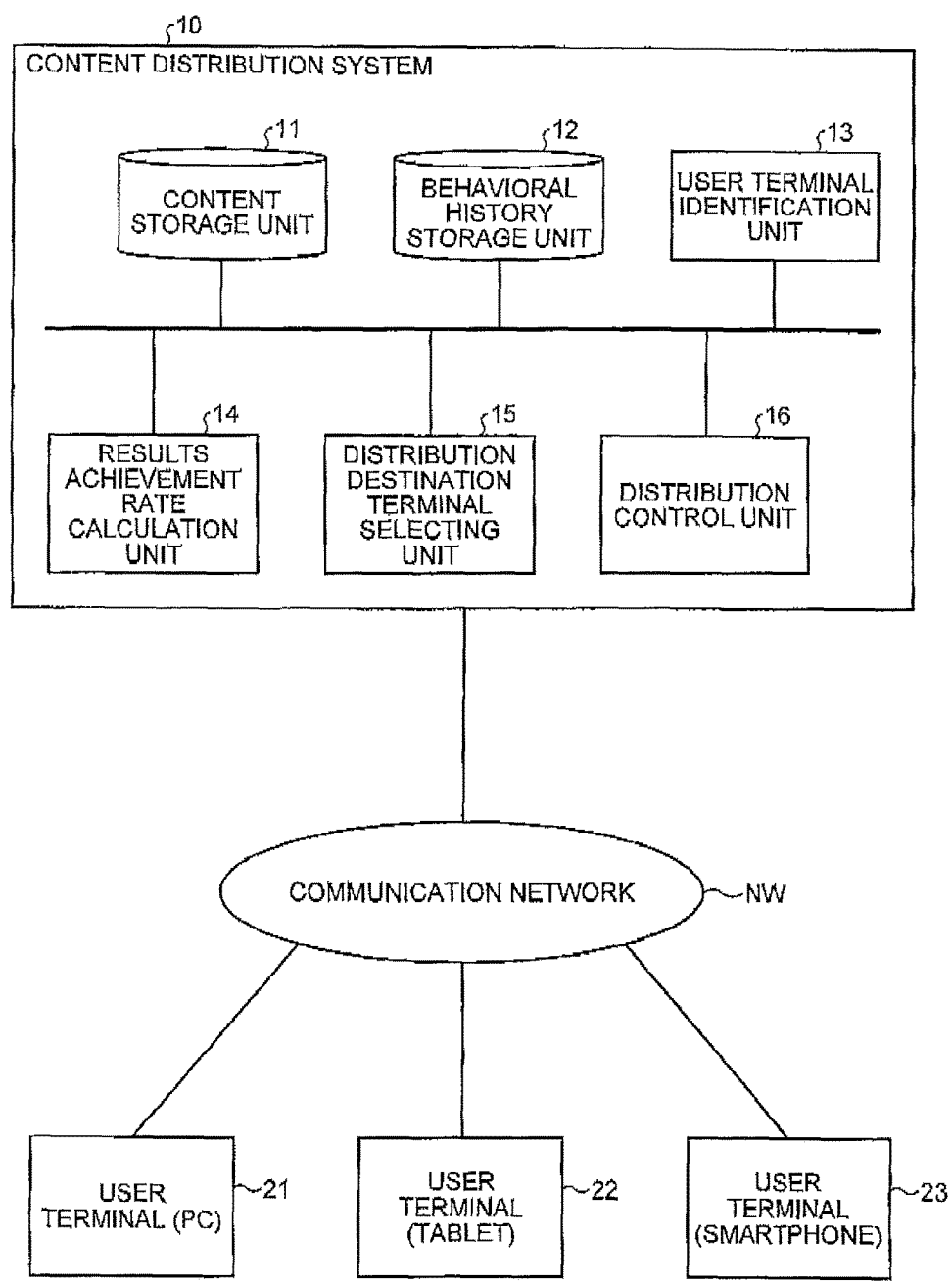
FIG. 1 is a block diagram illustrating a configuration of a content distribution system.

A principle of the present embodiment will be described first.

When a user uses a plurality of user terminals, the user in many cases selectively uses the user terminals according to the usage. This selective use is considered to be attributed to terminal types of the user terminals. For example, according to a comparative analysis of a smartphone and a personal computer (PC), the smartphone has the following features.

a. Utilization time is long, but it tends to be used during spare time which is relatively short.

b. It is often used just to kill time. For example, it is used in a train.

c. It is often used while another job is in process. For example, it is used while walking.

d. Having a small screen thereby making entry operation troublesome.

e. It is often used in public, having a potential risk of personal information leakage to others.

Meanwhile, a product purchase using a network, as a typical business model, includes processes of A: distributing an advertisement to a user, B: an interested user clicks on the advertisement, and C: purchase/registration of a product or a service that has been introduced in the advertisement.

For implementing the processes A and B among these processes, a smartphone is more suitable than a PC considering the features a and b described earlier. For implementing the process C, however, a PC is more suitable than a smartphone considering the features c, d, and e described earlier. That is, it is understandable that a smartphone is suitable for the processes A and B, and a PC is suitable for the process C.

For example, a user may click, on a smartphone, an advertisement of insurance or a loan and may start an application process. However, in many cases, the user feels troublesome at an entering operation for items, and gives up in the middle of application process, not reaching the intended conversion such as completion of application.

Based on these analysis results, the present embodiment has noticed that there is an effective combination suitable for the usage for the user among combinations between the distributed content and the distribution destination terminal, and arranges so that, when distributing content to the user, the content is distributed to the user terminal having the terminal type capable of making an effective combination with the content, among the plurality of user terminals being used by the user.

In addition, in specific determination on whether the combination between the content and the user terminal is the effective combination that is suitable for the usage, a user behavior toward the distributed content is important. According to the present embodiment, therefore, bearing distribution of advertisement content in mind, the determination is made based on a probability of achieving a certain level of results with respect to intended aims such as selecting operation by the user for the advertisement (clicking or tapping), and conversion (contract, membership registration, request for information brochure, and inquiry). The selecting operation by the user and the probability of conversion are calculable easily based on a behavioral history of the user.

Hereinafter, embodiments will be described with reference to the drawings.

First Embodiment

A content distribution system 10 according to a first embodiment will be described first with reference to FIG. 1. FIG. 1 is a block diagram illustrating a configuration of the content distribution system 10.

The content distribution system 10 has a function to select a distribution destination for the content, from among the plurality of user terminals being selectively used by a target user, when distributing content to the target user as a distribution destination.

The exemplary diagram in FIG. 1 illustrates, as user terminals used by the target user, a user terminal 21 including a PC, a user terminal 22 including a tablet, and a user terminal 23 including a smartphone. The user terminals 21 to 23 are connected with the content distribution system 10 via a communication network NW. Herein, the user terminals 21 to 23 related to one target user is illustrated for convenience of explanation. In an actual case, a large number of user terminals for each of the target users are connected.

Content Distribution System

Next, a configuration of the content distribution system 10 according to the present embodiment will be described in detail with reference to FIG. 1.

The content distribution system 10 is configured with one or more server devices as a whole, and includes a content storage unit 11, a behavioral history storage unit 12, a user terminal identification unit 13, a results achievement rate calculation unit 14, a distribution destination terminal selecting unit 15, and a distribution control unit 16, as main functional units.

Among these functional units, the content storage unit 11 and the behavioral history storage unit 12 are configured with hardware and a storage device such as a semiconductor memory as a whole. The user terminal identification unit 13, the results achievement rate calculation unit 14, the distribution destination terminal selecting unit 15, and the distribution control unit 16 are included in the computation processing unit configured to implement various functional processing by causing a CPU to execute programs in a storage unit (not illustrated). The program is stored in advance in the storage unit from an external device and/or a recording medium (neither illustrated) connected via the communication network NW.

The content storage unit 11 has a function to store various pieces of content to be distributed to the user terminals 21 to 23.

FIG. 2 is an exemplary configuration of the content storage unit. Herein, a content type and the content are registered for each of content IDs for identifying the content.

The content type is a classification according to the details of the content, and may be classified in advance based on a compatibility with feature of various terminals used by the user, such as the feature of the smartphone described earlier related to each of the content, and based on a relationship with individual processes on a network service. Also, the content includes various content data configuring the content, and also includes the content that contains a link to the content to be directed, or the content related to the content to be directed.

The behavioral history storage unit 12 has a function to store a behavioral history of each of the users.

FIG. 3 is an exemplary configuration of the behavioral history storage unit 12. Herein, information such as a user ID for identifying the user, terminal identification information for identifying the user terminal having been used for the behavior, the terminal type of the user terminal, and a user behavior have been registered as a set.

As the user ID, the ID the user uses at login to any service may be used. As the terminal identification information, identification information such as "bcookie" that is notified from a browser at an access to a server may be used. As the terminal type, identification information included in a "user agent name" that is notified from the browser at an access to the server may be used. As the behavior, information such as a content ID for identifying the content that has been a target for the behavior, an operation for the content, date and time of the behavior have been recorded.

The user terminal identification unit 13 has a function to identify the plurality of user terminals used by a same user, based on the behavioral history being associated with each of the users, that has been stored in the behavioral history storage unit 12.

As described earlier, when a user takes a behavior of login to a service, a behavioral history, namely, a login history includes a user ID that is specific to the user. Therefore, it is possible to confirm which behavioral history belongs to the same user, using the user ID as an intermediary. Furthermore, each of the behavioral histories includes the terminal identification information and the terminal type, as described earlier. Accordingly, extracting the terminal identification information included in the behavioral history of the same user ID makes it possible to identify the user terminal used by the same user, and to identify the terminal type.

The results achievement rate calculation unit 14 has a function to calculate, for each of combinations of a content type and a terminal type, a results achievement rate that indicates a ratio that a certain level of results has been achieved by a user operation for the content when the content of the content type has been distributed to the user terminal of the terminal type, based on the behavioral history in the behavioral history storage unit 12.

As described earlier, each of the behavioral history has recorded the terminal type, the content ID, and the behavior including operation. Therefore, it is possible to confirm whether an operation of achieving a certain level of results has been performed, with respect to a combination of the content type corresponding to the content ID obtained from the content storage unit 11, and the terminal type. The operation of achieving a certain level of results may include for example, a click on an advertisement, and an operation in response to operation symbols provided in the content, including a button corresponding to conversion such as contract, membership registration, request for information brochure, and inquiry.

The distribution destination terminal selecting unit 15 has a function to select, from among the plurality of user terminals 21 to 23 used by the target user that have been identified by the user terminal identification unit 13, a user terminal having a high probability of achieving a certain level of results by a behavior of the target user toward the content when the content is distributed, as a distribution destination terminal of the content, based on the behavioral history in the behavioral history storage unit 12.

At this time, the distribution destination terminal selecting unit 15 may select the distribution destination terminal based on the behavioral history that has been obtained from the plurality of users selected from the behavioral history storage unit 12, or based on the behavioral history related to the target user that has been selected from the behavioral history storage unit 12. Alternatively, the distribution destination terminal may be selected based on a relationship between the content type for the content that has been browsed on each of the user terminals and the terminal type of the user terminal, that have been extracted from the behavioral history in the behavioral history storage unit 12.

More particularly, the distribution destination terminal selecting unit 15 may select the user terminal for which the results achievement rate for each of the user terminals 21 to 23 calculated at the results achievement rate calculation unit 14 satisfies a predetermined standard, as a distribution destination terminal of the content. At this time, the results achievement rate may be calculated based on the behavioral history obtained from the plurality of users or based on the behavioral history related to the target user.

The distribution control unit 16 has a function to distribute content to the user terminal that has been selected by the distribution destination terminal selecting unit 15. At this time, the content may be distributed to an entire display screen of the distribution destination terminal, or to a display space provided to the content being browsed on the distribution destination terminal, such that the content is fit into the display space.

Operation in First Embodiment

Figure 4:
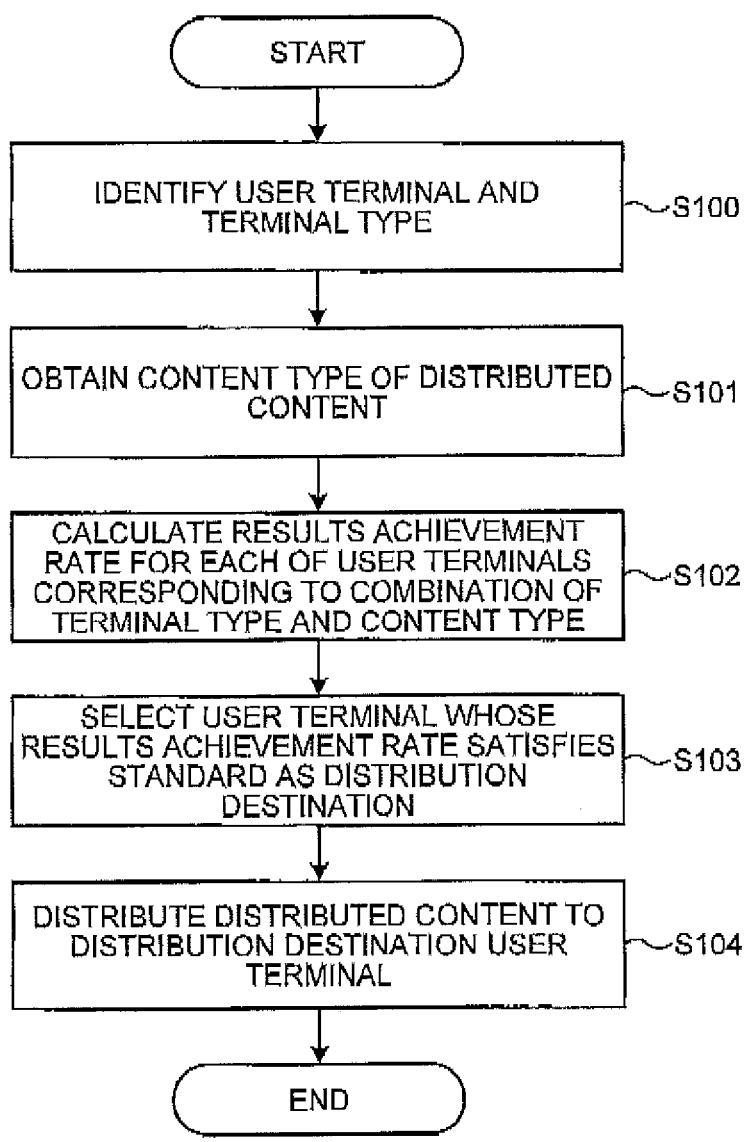
FIG. 4 is a flowchart illustrating content distribution processing.

Next, an operation of the content distribution system 10 according to the present embodiment will be described with reference to FIG. 4. FIG. 4 is a flowchart illustrating content distribution processing.

The content distribution system 10 executes the content distribution processing illustrated in FIG. 4 when distributing predetermined content to the target user.

Note that in executing the content distribution processing, the content that should be distributed is assumed to have been registered in the content storage unit 11. Also note that the target user is assumed to have been identified in advance and the behavioral history related to the target user is assumed to have been registered in the behavioral history storage unit 12 in advance.

First, the user terminal identification unit 13 identifies a plurality of user terminals 21 to 23 used by the same user, and at the same time, identifies the terminal type of the user terminals 21 to 23 based on the behavioral history that has been associated with each of the users, that has been stored in the behavioral history storage unit 12 (Step S100).

Next, the results achievement rate calculation unit 14 obtains the content type of the distributed content, from the content storage unit 11, as well as obtaining the terminal type of each of the user terminals 21 to 23, from the user terminal identification unit 13 (Step S101).

Subsequently, the results achievement rate calculation unit 14, calculates the results achievement rate of each of the user terminals 21 to 23 (Step S102) based on the combination of the content type and the terminal type.

Thereafter, the distribution destination terminal selecting unit 15 selects, from the plurality of user terminals 21 to 23 used by the target user, a user terminal having the highest results achievement rate and the user terminal whose results achievement rate satisfies a predetermined standard, as a distribution destination terminal of the content (Step S103).

In response to this, the distribution control unit 16 distributes content to the user terminal selected by the distribution destination terminal selecting unit 15 (Step S104), finishing a series of content distribution processing.

Figure 5:
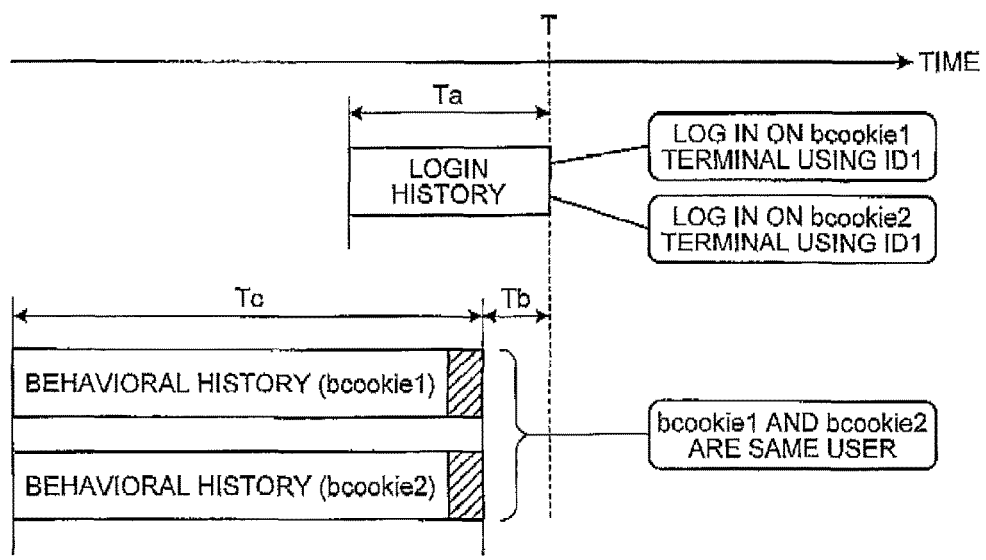
FIG. 5 is an explanatory diagram illustrating a terminal identification operation.

Next, the terminal identification operation at the user terminal identification unit 13 will be described with reference to FIG. 5. FIG. 5 is an explanatory diagram illustrating the terminal identification operation.

In identifying the user terminal of the target user at time T, the user terminal identification unit 13 first identifies a login determination period from the time T to a time point where a predetermined length of time Ta has elapsed from the time T, and then identifies a login ID of the target user based on the behavioral history of the target user, obtained during the login determination period. Next, all terminal identification information for the terminal that has logged in with the login ID within the login determination period is extracted from the behavioral history. This consequently identifies the terminal identification information of the plurality of user terminals used by the target user.

The login determination period is determined in consideration of validity of the terminal identification information. For example, the "bcookie" described earlier as an example of the terminal identification information has a preset validity period in an aspect of security. Therefore, in a relatively old behavioral history, information of "bcookie" may differ from current information. By providing the login determination period, it is possible to identify the user terminal based solely on the "bcookie" including a more up-to-date behavioral history. The length of time Ta may be determined according to the login frequency of the user.

At this time, if the login ID is solely used for totalization, for example, when the user has logged in both on the user terminal (PC) 21 and on the user terminal (smartphone) 23 by using the same user ID, it is possible to totalize the behavioral history transversely. However, in this case, it is not possible to totalize the behavioral history for a non-login state. On the other hand, if the terminal identification information is solely used for totalization, it is then possible to totalize the behavioral history for the non-login state, however, the user terminal (PC) 21 and the user terminal (smartphone) 23 are totalized, for example, as if they are user terminals that belong to separate users, even if they have been logged in using the same user ID.

In comparison, in a case where totalization is performed by mixing login ID and terminal identification information, as in the present embodiment, if login was made onto both of the user terminal (PC) 21 and the user terminal (smartphone) 23, using the same user ID within the login determination period, it is possible to totalize the behavioral history transversely, and also possible to totalize the behavioral history for the non-login state. As a result, it is possible to totalize the behavioral history of the same user more precisely.

Note that in the present embodiment, the login ID and the terminal identification information are used solely for the purpose of judging identicality. Therefore, there is no problem if the login ID and the terminal identification information have been encrypted. Therefore, the present embodiment enables using the login ID and the terminal identification information while keeping them concealed, it is possible to maintain an estimated security level.

Although the earlier example describes a case of extracting terminal identification information of the same target user by using the login ID, there may be a method without using any login ID. As illustrated in FIG. 5, for example, if there is a similarity between the information recorded at the behavioral histories, for example, between the browsed content or information operated or input by the user, it is allowable to estimate that these behavioral histories belong to the same user, and to extract terminal identification information from these behavioral histories.

In this example, the period between the past time point that is back for the length of time Tb from an identifying time point T, and the time point further back for the length of time Tc from Tb is identified as a behavioral history determination period. The terminal identification information is extracted from the behavioral history having a similarity within this behavioral history determination period. Providing the behavioral history determination period enables precise identification of the user terminal of the same target user. The lengths of time Tb and Tc may be determined according to an access frequency of the user.

Effects of First Embodiment

In the present embodiment, in this way, the distribution destination terminal selecting unit 15 is configured to select, from among the plurality of user terminals of the target user, a user terminal having a high probability of achieving a certain level of results by a behavior of the target user toward content when the content is distributed, as a distribution destination terminal of the content, based on the behavioral history in the behavioral history storage unit 12.

This enables selecting the content distribution destination properly according to the usage of the user terminal, from the plurality of terminals used by the same target user, making it possible to resolve a mismatch between the distributed content and the distribution destination user terminal. Accordingly, this allows the target user to smoothly browse the distributed content with no stress, and makes it possible to increase a ratio of causing the user to take an intended action after browsing the content. In a case of advertisement content, in particular, it is possible to expand selecting operations for the advertisement and conversion opportunities, and to implement highly efficient advertisement distribution.

Second Embodiment

Next, the content distribution system 10 according to a second embodiment will be described.

According to the first embodiment, it is possible to identify the plurality of user terminals used by the target user by using the user terminal identification unit 13. In the present embodiment, description will be given on a distribution method when the distribution control unit 16 distributes content to the plurality of user terminals used by the target user.

Figure 6:
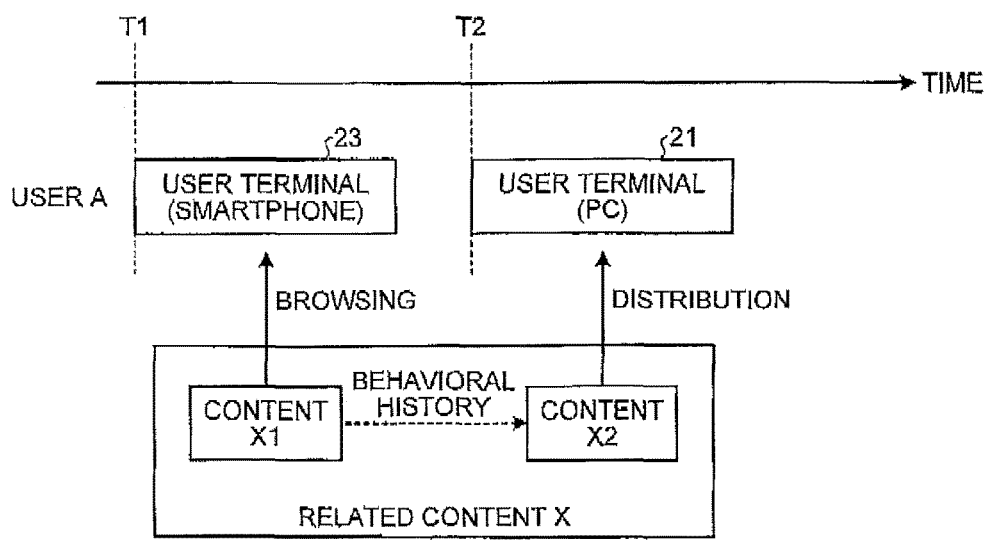
FIG. 6 is an explanatory diagram illustrating a content distribution method for a plurality of user terminals.

First, description will be given on a case where the content browsed or operated by the target user on any of the user terminals 21 to 23 used by the target user, is distributed also to another user terminal, with reference to FIG. 6. FIG. 6 is an explanatory diagram illustrating a content distribution method for a plurality of user terminals.

At this time, it is possible, using a known technique, to record the behavioral history related to the content browsing as a behavioral history, in the behavioral history storage unit 12. The distribution control unit 16 may distribute the content browsed or operated by the target user to other user terminals, based on behavioral history. Herein, content X1 for smartphone and content X2 for PC are assumed to have been registered in the content storage unit 11, as related content X.

More particularly, as illustrated in FIG. 6, if a user A has browsed content X1 at time T1 on a user terminal (smartphone) 23 for smartphone, it is expected that the user A is interested in a related content X. Accordingly, at a later time T2, when the user A operates on the user terminal (PC) 21 to access a certain server, the distribution control unit 16 distributes content X2 for PC, among the related content X, to a display space provided to the content distributed from the same server.

With this method, if the user A has searched for real estate properties in Yokohama on a PC in a home of the user A in Yokohama, it is possible to distribute an advertisement related to real estate properties in Yokohama to a PC in a company in Tokyo where the user A works for, as the content for a PC, based on the behavioral history. Furthermore, if the user A uses his smartphone on his way to work, it is possible to distribute an advertisement related to real estate properties in Yokohama to the smartphone, as the content for a smartphone. Consequently, it is possible to distribute, across different terminals, the advertisement related to real estate properties in Yokohama in which the user A has been interested, to another user terminal, using the content suitable for the terminal type.

Since there is no stress due to a mismatch between the terminal type and the content type even when similar advertisement is distributed to the user A repeatedly using the content suitable to the terminal type, it is possible to increase a ratio of causing the user A to take an intended action. As a result, when the content is advertisement content, in particular, it is possible to expand a selecting operation for the advertisement and conversion opportunities, and to implement highly efficient advertisement distribution.

Figure 7:
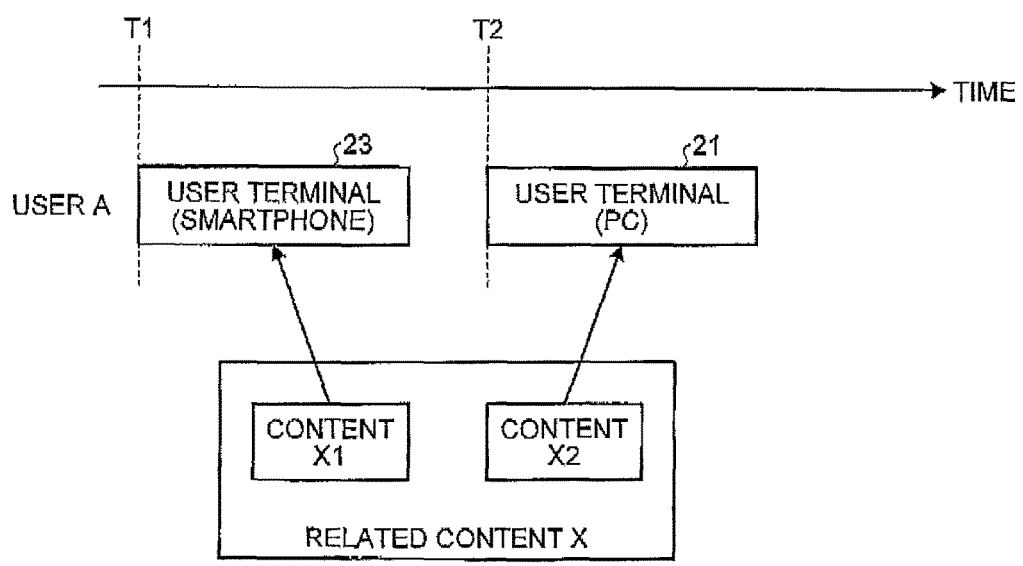
FIG. 7 is an explanatory diagram illustrating another content distribution method for a plurality of user terminals.

Next, a case of distributing each of the same content or mutually-related content, to the plurality of user terminals among the user terminals 21 to 23 used by the target user, will be described with reference to FIG. 7. FIG. 7 is an explanatory diagram illustrating another content distribution method for a plurality of user terminals. At this time, the content to be distributed is assumed to have been determined in advance, and content X1 for smartphone and content X2 for a PC are assumed to have been registered in the content storage unit 11, as related content X.

More particularly, as illustrated in FIG. 7, when the user A operates at time T1 on the user terminal (smartphone) 23 to access a certain server, the distribution control unit 16 distributes content X1 for a smartphone, among the related content X, to a display space provided to the content distributed from the same server. Furthermore, at a later time T2, when the user A operates on the user terminal (PC) 21 to access a certain server, the distribution control unit 16 distributes content X2 for a PC, among the related content X, to a display space provided to the content distributed from the same server.

Accordingly, when distributing an automobile advertisement to the user A, for example, it is possible to distribute the automobile advertisement having content X1 for a smartphone, to the user terminal (smartphone) 23 and to distribute the automobile advertisement having content X2 for a PC, to the user terminal (PC) 21.

Since there is no stress due to a mismatch between the terminal type and the content type even when a similar advertisement is distributed to the user A repeatedly, it is possible to increase a ratio of causing the user A to take an intended action. As a result, when the content is advertisement content, in particular, it is possible to expand a selecting operation for the advertisement and conversion opportunities, and to implement highly efficient advertisement distribution.

The following describes a case where the number of times of distribution of each content is counted for each of the user terminals 21 to 23 used by the target user, with reference to FIG. 8. In this case, if the total number of times of distribution of these contents exceeds a given threshold, distribution to all of the user terminals 21 to 23 of the target user is discontinued. FIG. 8 illustrates a counting example of the number of times of content distribution. Herein, a threshold for the total number of times of distribution of content for the user A is set to 10.

In particular, the distribution control unit 16 counts, as illustrated in FIG. 8, the number of times of distribution related to content X and Y, for each of terminals that belong to the user A, namely, the user terminal (PC) 21, the user terminal (tablet) 22, and the user terminal (smartphone) 23. Herein, the total number of times of distribution of the content X counts 11, which exceeds the threshold. Accordingly, distribution of the content X for each of the user terminals 21 to 23 is determined as unacceptable. On the other hand, the total number of times of distribution of content Y is 9, which does not yet exceed the threshold. Accordingly, distribution of the content Y for each of the user terminals 21 to 23 is determined as acceptable.

Accordingly, in distributing a health food advertisement to the user A, if the total number of times of distribution to the user terminals 21 to 23 has exceeded the threshold for a certain advertisement, it is determined that the user A has lost interest in the health food. Then, distribution to all of the user terminals 21 to 23 is discontinued.

It is therefore possible to determine whether to discontinue distribution based on a prescribed limitation, when related content is repeatedly distributed to the user terminals 21 to 23 of the user A, and to alleviate stress on the user A. As a result, in a case of content which is determined as unacceptable, it is possible to discontinue distribution of advertisement that does not interest a user to all of user terminals, and to increase an opportunity to distribute a new advertisement to the user, enabling implementation of highly efficient advertisement distribution.

Extension of Embodiments

The present embodiments invention has been described; however, the present embodiments are not intended to be limited to the above-described embodiments. Configuration and details of the present embodiments may be modified in various ways, understandably to a person skilled in the art, within a scope of the present embodiments. Furthermore, each of the embodiments may be appropriately combined with each other within a range implementable without contradiction.

According to the present invention, it is possible to select the content distribution destination, according to the usage, from among a plurality of terminals used by the target user. This enables selecting the content distribution destination properly according to the usage of the user terminal, making it possible to resolve the mismatch between the distributed content and the distribution destination user terminal. Accordingly, it is possible to allow the target user to smoothly browse the distributed content with no stress, and possible to increase a ratio of causing the user to take an intended action after browsing the content. In a case of advertisement content, in particular, it is possible to expand selecting operations for the advertisement and conversion opportunities, and to implement highly efficient advertisement distribution.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:
1. A content distribution system comprising:
a memory storing a behavioral history of a plurality of users, the behavioral history registering parameters in a set, the parameters including at least: a plurality of user ID corresponding to each respective user, a plurality of terminal identification information identifying each respective terminal, a plurality of terminal types identifying a type of each respective terminal, and one or more behaviors associated with each respective user;
a processor operatively coupled to the memory, the processor being programmed to:
receive a user ID used by a target user at login of any service,
select, from among a plurality of user terminals of the target user, a user terminal having a high probability of achieving a certain level of results by a behavior of the target user toward content when the content is distributed, the user terminal being selected based on the parameters stored behavioral history associated with the received user ID, including at least one of: a terminal identification information, a terminal type, or one or more behaviors associated with the received user ID,
set the selected user terminal as a distribution destination terminal of the content, and
distribute the content to the selected user terminal that is set as the distribution destination terminal.

2. The content distribution system according to claim 1, wherein
the processor is further programmed to:
identify the plurality of user terminals used by the same user, based on the stored behavioral history associated with each of the users, and
the processor selects the distribution destination terminal from among the identified user terminals of the target user.

3. The content distribution system according to claim 1, wherein
the processor selects the distribution destination terminal based on the stored behavioral history related to the target user.

4. The content distribution system according to claim 1, wherein
the processor selects the distribution destination terminal based on a relationship between a content type for the content that has been browsed on each of the user terminals and a terminal type of the user terminal, that has been extracted from the stored behavioral history.

5. The content distribution system according to claim 1, wherein
the processor is further programmed to:
calculate, for each of combinations of the content type and the terminal type, a results achievement rate that indicates a ratio that a certain level of results has been achieved by a user operation for the content, when the content of the content type has been distributed to the user terminal of the terminal type, based on the stored behavioral history, and
the processor selects a user terminal whose results achievement rate related to the content satisfies a predetermined standard as a distribution destination terminal of the content, from among the user terminals of the target user.

6. The content distribution system according to claim 1, wherein
the processor distributes the content that has been selected or browsed by the target user on any user terminal among the user terminals of the target user, or the related content, to another user terminal.

7. The content distribution system according to claim 1, wherein
the processor distributes each of any of the same content or mutually related content to the plurality of user terminals among the user terminals of the target user.

8. The content distribution system according to claim 1, wherein
the processor counts the number of times of distribution of each content for each of the user terminals of the target user, and if the total number of times of distribution has exceeded a threshold for certain content, distribution of the content to all of the user terminals of the target user is discontinued.

9. The content distribution system according to claim 1, wherein
the content includes the content that contains a link to a location to be directed, or includes the content related to the content to be directed.

10. The content distribution system according to claim 1, wherein
the processor distributes the content to a display space provided to the content browsed on the distribution destination terminal.

11. A content distribution method performed by a content distribution system, the content distribution system storing a behavioral history of a plurality of users, the behavioral history registering parameters in a set, the parameters including at least: a plurality of user ID corresponding to each respective user, a plurality of terminal identification information identifying each respective terminal, a plurality of terminal types identifying a type of each respective terminal, and one or more behaviors associated with each respective user, the content distribution method comprising:
receiving a user ID used by a target user at login of any service;
selecting from among a plurality of user terminals of the target user, a user terminal having a high probability of achieving a certain level of results by a behavior of the target user toward content when the content is distributed, the user terminal being selected based on the parameters stored behavioral history associated with the received user ID, including at least one of: a terminal identification information, a terminal type, or one or more behaviors associated with the received user ID;
setting the selected user terminal as a distribution destination terminal of the content; and
distributing the content to the user terminal that is set as the distribution destination terminal.

12. A non-transitory computer-readable storage medium with an executable program stored thereon configured for use with a content distribution system storing a behavioral history of a plurality of users, the behavioral history registering parameters in a set, the parameters including at least: a plurality of user ID corresponding to each respective user, a plurality of terminal identification information identifying each respective terminal, a plurality of terminal types identifying a type of each respective terminal, and one or more behaviors associated with each respective user, the program causing a computer in the content distribution system to perform steps comprising:
selecting from among a plurality of user terminals of the target user, a user terminal having a high probability of achieving a certain level of results by a behavior of the target user toward content when the content is distributed, the user terminal being selected based on the parameters stored behavioral history associated with the received user ID, including at least one of: a terminal identification information, a terminal type, or one or more behaviors associated with the received user ID;
setting the selected user terminal as a distribution destination terminal of the content; and
distributing the content to the user terminal that is set as the distribution destination terminal.

* * * * *